United States Patent [19]

Smith

[11] Patent Number: 4,871,381

[45] Date of Patent: Oct. 3, 1989

[54] AIR FILTER HOUSING ASSEMBLY FOR GASOLINE ENGINE POWER TOOLS

[76] Inventor: George C. Smith, 1738 Edeline Ave., McKinleyville, Calif. 95521

[21] Appl. No.: 212,567

[22] Filed: Jun. 28, 1988

[51] Int. Cl.$^4$ .......................................... B01D 46/02
[52] U.S. Cl. .................................. 55/385.3; 55/507; 55/508; 55/510; 55/519; 30/381
[58] Field of Search ................... 55/385.3, 495, 503, 55/505, 507, 508, 510, 511, 517, 519; 30/381

[56] References Cited

U.S. PATENT DOCUMENTS

| | | | |
|---|---|---|---|
| 3,218,785 | 11/1965 | Tietz | 55/503 |
| 3,339,533 | 9/1967 | Nordstrom | 55/505 X |
| 3,710,562 | 1/1973 | McKenzie | 55/505 X |
| 3,785,129 | 1/1974 | Szmutko | 55/505 X |
| 4,265,647 | 5/1981 | Donachiue | 55/385.3 X |
| 4,594,083 | 6/1986 | Hiraizumi | 55/385.3 |

FOREIGN PATENT DOCUMENTS 0928497  6/1963  United Kingdom .................. 55/505

OTHER PUBLICATIONS

Dollinger Corporation, "Staynew Intake Filters", Bulletin 100.

*Primary Examiner*—Charles Hart
*Attorney, Agent, or Firm*—Nixon & Vanderhye

[57] ABSTRACT

An air filter assembly for a power tool such as a chain saw is provided. The assembly includes a housing with upper and lower components sandwiched about a filter element. The lower housing component includes a plurality of apertures arranged about its periphery for uniformly introducing air into the filter and through an outlet. The outlet is connected to a flexible coupling element adapted to be secured to the carburetor of an internal combustion engine which drives the tool. The upper and lower housing components are easily separated to permit access to the filter element.

18 Claims, 3 Drawing Sheets

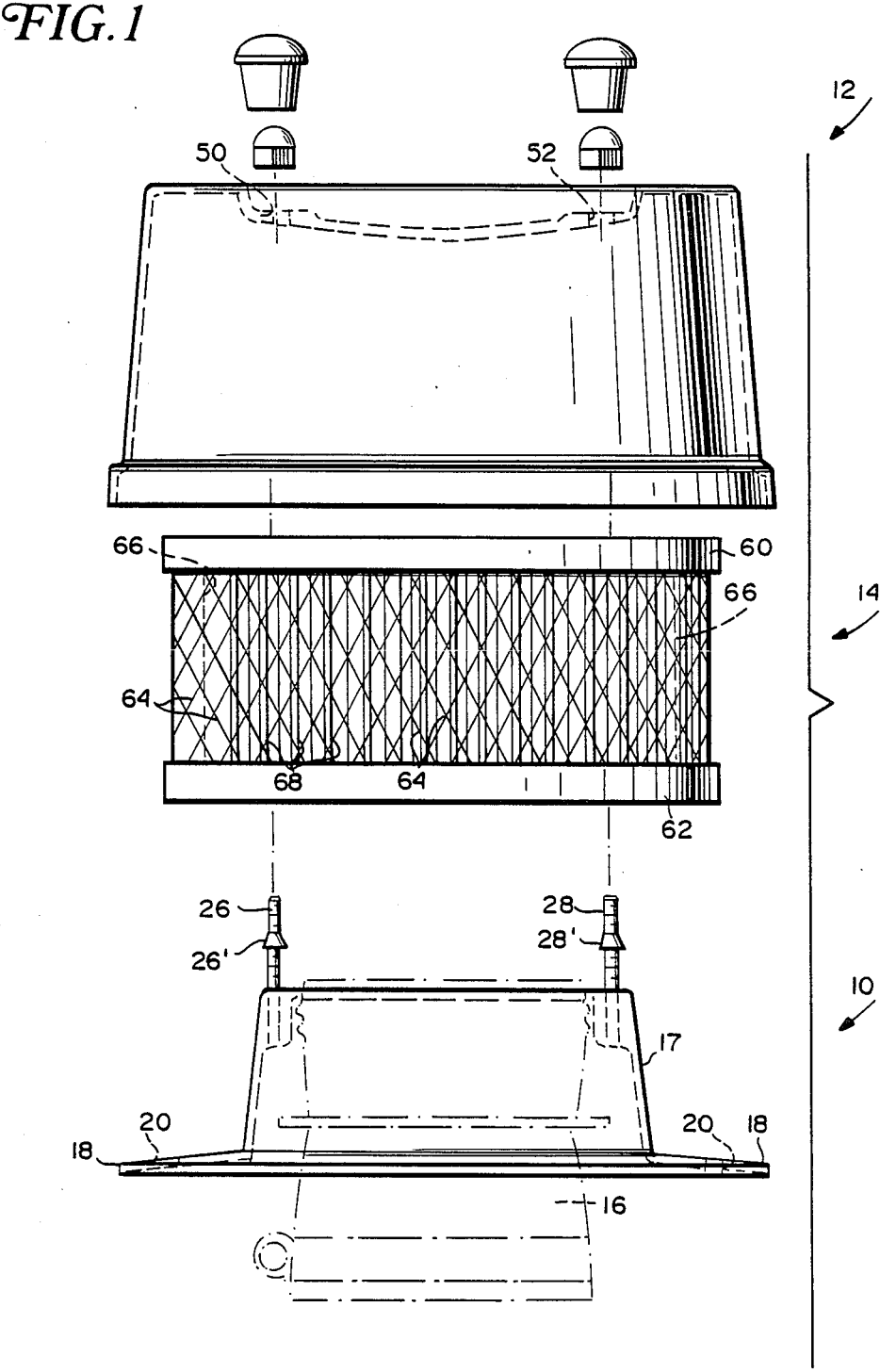

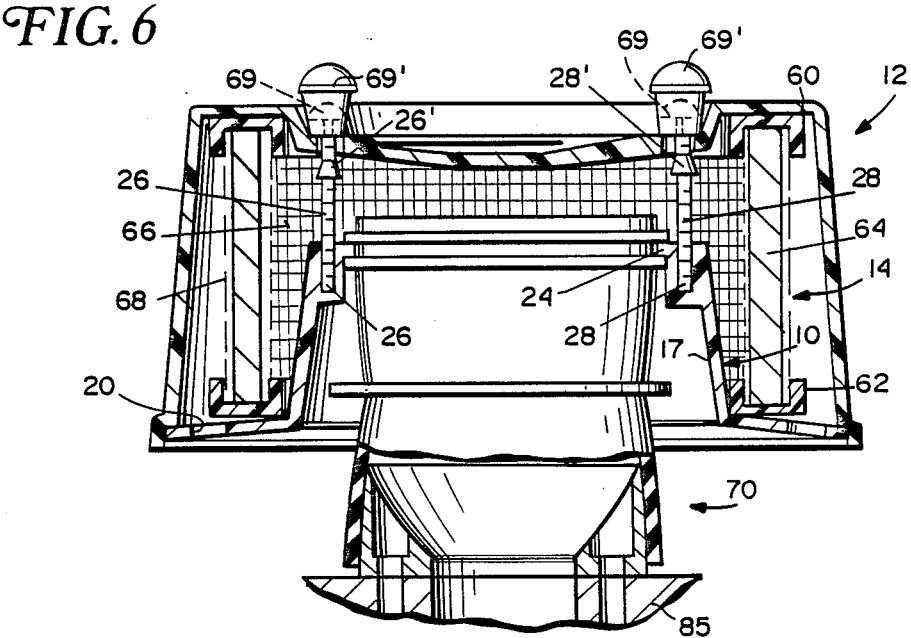

AIR FILTER HOUSING ASSEMBLY FOR GASOLINE ENGINE POWER TOOLS

BACKGROUND AND SUMMARY OF THE INVENTION

This invention relates generally to air filters for use with power tools, and particularly for use with tools, such as chain saws, which are powered by an internal combustion engine. More specifically, the invention relates to a unique housing assembly for enclosing an air filter to protect it from dust and debris while at the same time providing for uniform air flow around and through the filter.

As will be readily understood by those skilled in the art, it is imperative for good gasoline engine performance that clean, filtered air be supplied to the carburetor. It is, of course, known to provide filter elements for this purpose. However, in the environment of power tools, and especially chain saws, there are special problems related to the direct exposure of the air filter elements to significant amounts of dirt and debris generated by the tool itself during normal operation. For example, in the case of chain saws, filters often become clogged by dust, wood particles and even larger wood chips created by the cutting action of the saw. The problem is compounded by the presence of oil and grease around the engine, saw blade, etc. to which dirt and dust adhere.

Exposed filters, whether they be of the conventional foam or corrugated paper type, tend to draw air through paths of least resistance, so that the flow of air through the filter is not evenly distributed. As a result, the paths of least resistance are also the first to clog with dirt. This, if course, shortens the useful life (or periods between cleaning) of the filter, and negatively impacts on the performance of the engine. Moisture transfer through such exposed filters is an additional problem which may also adversely affect performance, and may even result in equipment failure.

Exposed filter elements are also subject to physical damage resulting from rough treatment of the tool, and/or flying debris, etc.

It is therefore the objective of this invention to provide protection for the filter element and to improve its performance by establishing a more uniform air flow around and through the filter, thus extending the life and/or time periods between required cleanings.

To effect this objective, the present invention provides a housing assembly for enclosing an air cleaner element, and an associated flexible coupling element for mounting the assembly to the engine. The flexible coupling provides additional benefits insofar as it is designed to break, or pull away from the engine upon impact, thus minimizing or preventing damage to the filter element and housing assembly, or the engine, or both.

The housing assembly of this invention comprises, in one exemplary embodiment, upper and lower annular components releasably secured together, with an annular filter element sandwiched therebetween.

The lower component comprises a centrally arranged, upstanding and slightly inwardly tapered hollow or tubular hub portion, and a peripheral flange extending radially outwardly from the lowermost end of the hub portion. The peripheral flange is provided with a plurality of apertures adjacent the outermost edge of the flange, and extending about the entire annular periphery thereof.

The uppermost end of the hub portion is provided with a relatively small, radially inwardly directed flange which supports a pair of diametrically opposed, upstanding threaded stud fasteners.

The upper housing assembly component in this exemplary embodiment has the general configuration of a slightly tapered inverted cup. Thus, an uppermost, substantially horizontal top wall surface is provided, having a downwardly extending and outwardly tapering peripheral skirt portion which terminates in a downwardly extending peripheral lip, radially offset from the depending skirt portion by a short, radially outwardly extending flange or step.

The substantially horizontal top wall surface may be provided with a centrally located indented portion provided with a pair of diametrically opposed apertures.

The filter element per se forms no part of this invention, other than in the context of its combination with the housing assembly described above. In any event, the filter element with which the housing of this invention is designed to be used has a open-ended cylindrical or tubular shape, wherein the outer diameter of the element exceeds its length. Typically, an annular, corrugated paper filter is sandwiched between a pair of rigid reinforcing rings formed of hard rubber, plastic, or the like.

Other filter elements may be used with the disclosed housing assembly, e.g., annular tapered filter elements may be received within the housing as well.

To assemble the housing components and associated filter element, the latter may be supported on the radially outwardly directed flange at the base of the hub portion of the lower component, with the hub portion extending upwardly into the interior of the filter element from below. The radially outwardly extending peripheral flange is sized so that the peripherally arranged apertures lie radially outwardly of the filter element.

The upper component of the housing assembly may then be placed over the filter element, such that the upper reinforcing ring of the filter is engaged by a radially outward portion of the substantially horizontal top wall, and so that the centrally located indented portion, if provided, extends slightly into the interior of the filter from above. At the same time, the outermost edge of the radially outwardly directed peripheral flange on the lower component abuts the flange or step portion connecting the depending skirt and lip portions of the upper component, with the lip extending downwardly, slightly beyond the radial edge of the peripheral flange of the lower component. The upwardly extending threaded stud fasteners, mounted in the hub portion of the lower component, are adapted to extend through the apertures in the indented area of the upper portion. The housing portions are then releasably secured together by the application of nuts of any suitable type to the threaded studs. It will be appreciated that the upper and lower housing components may be held together by any of a variety of suitable releasable connecting means.

It will also be appreciated that the upwardly extending wall of the hub portion of the lower component, and the depending skirt portion of the upper component, extend substantially parallel to one another, but in radially spaced relationship to accommodate the radial thickness of the air cleaner element.

Additional radial space is provided between the periphery of the air cleaner element and the depending skirt portion so that, in use, air may be pulled into the housing through the apertures in the radially outwardly extending flange of the lower component, uniformly about the entire periphery of the filter. Because the upper reinforcing ring of the filter element engages the top wall of the upper component, the incoming air is constrained to flow through the filter element and thereafter through the hub portion and associated coupling element to the carburetor as hereinafter described.

To facilitate mounting of the air cleaner and housing assembly to the engine of a power tool such as a chain saw, one or more couplers may be provided, depending on the configuration of the engine carburetor.

One coupler configuration in accordance with the invention is formed of a flexible tubular material, open at both ends, such that one end may be releasably attached to the filter housing assembly, and the other end may be releasably attached to the engine carburetor. In this configuration, the upper open end of the coupler is profiled about its exterior surface to provide a means cooperable with the inwardly directed radial flange provided at the upper end of the lower component hub portion to releasably secure the coupling to the filter housing. At the same time, the lower end of the coupler may be fitted with a metal ring-like adapter which may be clamped within the coupling and thereafter secured by screws or other suitable means to the carburetor. The particular sequence of assembly and attachment of the various components may vary as explained further herein.

In another coupling arrangement, a specific carburetor adapter may be molded in place within the lower portion of the coupler for ready attachment to the carburetor.

Because of the wide range of engine sizes and manufacturers in the chain saw field, the size and shape of the coupling elements may also vary. It is therefore within the scope of this invention to provide a coupling element which will adapt the filter housing assembly to any number of known engine and carburetor designs.

It will therefore be apparent that the invention provides a unique air filter housing assembly which protects the filter element, and enhances the performance of both the filter and the engine. Because of the great flexibility in the design of the coupling elements, the invention is easily adapted to fit virtually all chain saws, as original equipment or as a retrofit.

BRIEF DESCRIPTION OF THE DRAWINGS

FIG. 1 is an exploded view of a filter housing assembly and associated filter element in accordance with an exemplary embodiment of the invention;

FIG. 6 is a partial side cross-sectional view of an assembled filter housing assembly, filter element and coupling in accordance with an exemplary embodiment of the invention;

FIG. 7 is a side view, partially in section, of a coupling element in accordance with the invention;

FIG. 8 is a side view of a coupling element in accordance with another embodiment of the invention; and FIG. 9 is a sectional view taken along the line 9—9 of FIG. 8.

DETAILED DESCRIPTION OF THE DRAWINGS

With reference now the drawings, FIG. 1 illustrates an exploded view of the various components of an air filter and housing assembly in accordance with one exemplary embodiment of the invention including a lower housing component 10, an upper housing component 12 and an air filter element 14. In addition, a coupling 16 is shown (in phantom) attached at one end to the lower component 10, it being understood that the other end of the coupler is adapted for attachment to a carburetor inlet on an internal combustion engine of a power tool such as a chain saw.

It is to be understood that any reference to "upper" and "lower", "top" or "bottom" and "horizontal" or "vertical" in the description which follows has reference to the assembly as it is shown in FIGS. 1 and 6. The assembly may, of course, be oriented in any direction, depending on the design of the tool and engine with which it is to be used.

Figure 3:
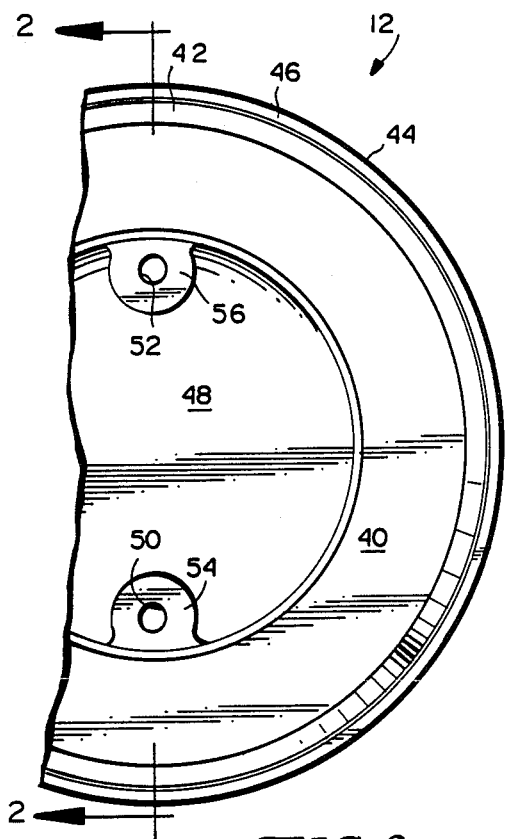
FIG. 3 is a partial top view of the upper housing component in accordance with an exemplary embodiment of the invention.
Figure 2:
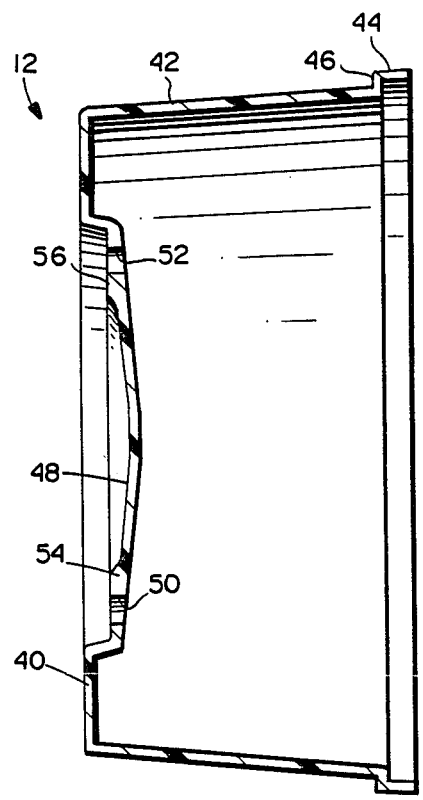
FIG. 2 is a side cross-sectional view taken along the line 2—2 of FIG. 3.
Figure 5:
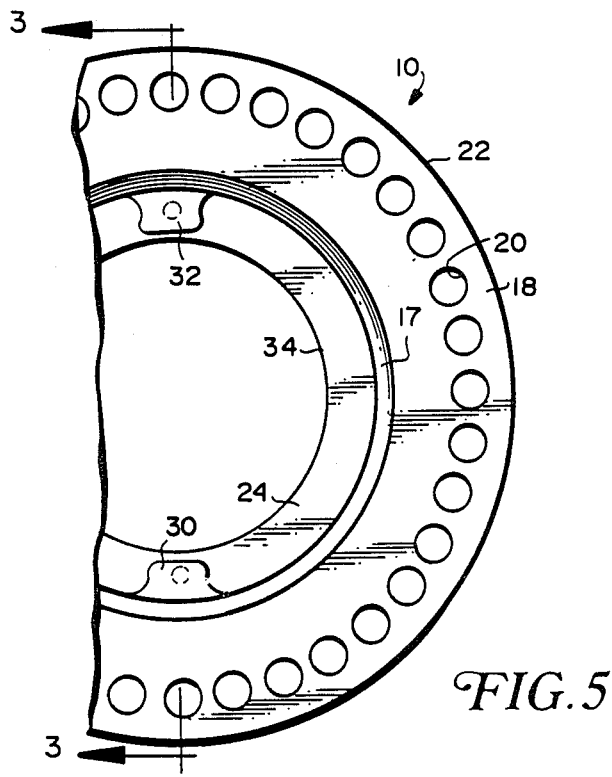
FIG. 5 is a partial bottom view of the lower housing component in accordance with an exemplary embodiment of the invention.
Figure 4:
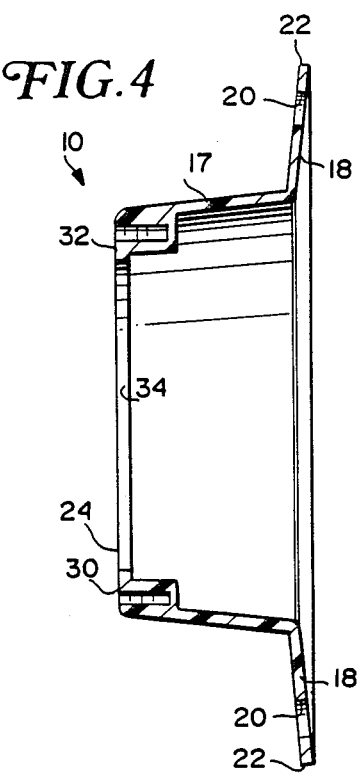
FIG. 4 is a side cross-sectional view taken along line 4—4 of FIG. 5.

With further reference to FIGS. 4 and 5, the lower component 10 is formed with a outwardly extending and slightly inwardly tapered, upstanding, hollow hub portion 17, surrounded by a radially outwardly extending peripheral flange 18 integrally formed with the hub and extending outwardly from the lowermost edge thereof. As best seen in FIG. 5, the peripheral flange 18 is provided with a plurality of apertures 20 adjacent the outermost free edge of the flange, and extending about the entire periphery of the flange.

The uppermost end of the hub portion 17 is formed with a relatively small, radially inwardly directed flange 24 which defines an annular housing outlet for the air as it leaves the filter assembly and enters a coupling mounted between the filter assembly and the carburetor. The flange 24 supports two upwardly extending threaded stud fasteners 26, 28 (FIGS. 1 and 6) located diametrically opposite each other and threadably secured within threaded bores formed in two embossments 30, 32 integrally formed with the underside of the flange. Stop elements 26' and 28' are provided on the studded fasteners for a purpose to be described further hereinbelow.

With specific reference to FIGS. 1, 4 and 6, it will be appreciated that the outwardly extending radial flange 18 extends in a slightly downward direction away from the central hub portion 17, while the radially inwardly directed flange 24 is substantially horizontal. As indicated earlier, the hub portion tapers slightly inwardly as it extends from the lower radially outwardly direct flange 18 to the upper radially inwardly directed flange 24, primarily to facilitate removal from the mold in which it is formed.

With reference now to FIGS. 1, 2, 3 and 6, the upper component 12 of the filter housing assembly has a generally cup-like configuration which includes an uppermost substantially horizontal top wall 40 surrounded by a downwardly depending and slightly outwardly extending skirt portion 42. The depending skirt portion 42 terminates at a downwardly extending peripheral lip 44 which is radially offset from the depending skirt 42 by substantially horizontal, radially outwardly extending flange or step portion 46. Top wall 40 is provided with a centrally located indented portion 48 which, in turn, is provided with a pair of diametrically opposed apertures 50, 52. These apertures are formed in reinforced embossments 54, 56, respectively. It will be understood that the apertures 50, 52 are arranged to receive the threaded stud fasteners 26, 28 extending upwardly from the lower housing component 10 as will be described in greater detail hereinafter.

The upper and lower components of the filter housing assembly are preferably injection molded, glass filled poly carbol plastic material, although separate other suitable materials may be employed. The plastic material is preferably made transparent so that the air cleaner element within the housing assembly may be visually inspected as necessary or desired.

The air cleaner element 14 itself forms no part of this invention. Nevertheless, a description of one such element suited for use with the filter housing is necessary to ensure a clear understanding of the construction, assembly and operation of the invention. As illustrated in FIGS. 1 and 6, an air filter element 14 has a substantially hollow, cylindrical shape including hard rubber, plastic or the like, upper and lower reinforcement rings 60, 62 sandwiched about a corrugated filter element 64. The interior of the filter may be provided with a peripheral inner screen 66, while the exterior of the filter may be provided with a somewhat larger and stronger mesh screen 68 to protect the corrugated filter element 64 and to provide overall reinforcement to the filter itself. In normal applications, the outer diameter of the air filter element is greater than its length, but it is within the scope of this invention to adapt the housing to permit enclosure of filter elements having various sizes and shapes.

With further reference now to FIGS. 1 and 6, it will be appreciated that in order to assemble the air cleaner element and the housing assembly, the filter 14 may be initially placed over the central hub portion 17 of the lower component 10 so that the lower reinforcing ring 62 of the filter is supported on the radially outwardly extending flange 18. In this position, the lower reinforcing ring 62 lies radially inwardly of the plurality of apertures 20 extending about the outer portion of the flange 18. Thereafter, the upper component 12 is placed over the filter element 14 and hub portion 17 of the lower component 10, so that the upwardly extending threaded stud fasteners 26, 28 extend through the apertures 50, 52. At the same time, the radially outermost portion of the peripheral radial edge of the flange 18 engages the radial offset 46 of the upper component while the peripheral lip portion 44 of the upper component extends downwardly beyond the flange 18 as best seen in FIG. 6.

The upper and lower housing components may then be releasably secured by threading a pair of nut elements 69, which may be conventional nuts enclosed or encapsulated in easily grippable members 69', 69', respectively. The stop elements 26', 28' on threaded stud fasteners 26, 28 prevent the nuts 69 from being over tightened on the fasteners 26, 28, thus preventing possible damage to the upper and/or or lower housing components.

In the assembled position, it will be appreciated that the upstanding hub portion 17 of the lower component 10 lies substantially inwardly, but parallel to, the depending skirt portion 42 of the upper component 12. The peripheral space between the hub portion 17 and depending skirt portion 42 is sufficient to accommodate the radial thickness of the filter element 14. Additional space between the periphery of the filter element and the depending skirt portion 42 permits the introduction of air through the apertures 20 in the peripheral flange 18. Because the upper and lower rings 60 and 62 of the filter element are in effect sealed against the horizontal top wall 40 of the upper component and inner portion of the radial flange 18 of the lower component, respectively, the air which is introduced through the apertures 20 is constrained to flow through the filter element and through the outlet defined by flange 24 on the hollow hub portion 17 of the lower component. From the outlet, the air flows through a coupling element, and into the engine carburetor as described in greater detail below.

The coupling elements provided by this invention are adapted for attachment between the housing assembly described hereinabove and the carburetor of an internal combustion engine, preferably of the type used on chain saws and other power tools. With reference to FIGS. 1, 6 and 7, an exemplary coupling element 70 is illustrated which is adapted for use with a number of engine designs, and includes a tubular body portion formed of neoprene or other suitable, flexible material. The element is divided into an upper part 72 and a lower part 74 by an intermediate radially outwardly extending flange 76. The upper edge of the coupler body is profiled or ribbed as at 78 to provide groove means 79 for releasably attaching the upper end of the coupling to the lower component 10 of the filter housing. More specifically, the inwardly directed flange 24 of the lower component 10 is received within the groove 79 upon insertion of the coupling into the hollow interior of hub portion 16, as best seen in FIG. 6.

For certain engine designs, the lower portion 74 of the coupling may be fitted with a metal (e.g., steel) adapter ring 80 which is provided with a pair of diametrically opposite bores 82, 84 for facilitating attachment to a manifold or carburetor of the engine 85 of a chain saw or other power tool. It will be understood that while the adapter 80 is shown to be attached to the coupling in FIG. 7, typically, the adapter will be secured to the engine carburetor or manifold and the lower portion 74 of the coupling may then be telescoped over the adapter and secured by a conventional hose clamp 86 or other suitable clamping means.

In the arrangement described hereinabove, the it will be appreciated that once initial assembly has been completed, the coupling 70 and lower component 10 of the filter assembly may remain attached to the engine of the chain saw, it being necessary only to remove the nuts 69 and the upper housing component 12 in order to clean and/or replace the air filter element 14.

FIG. 8 illustrates an alternative coupling arrangement which does not require a separate adapter 80 as shown in FIG. 7. The coupling disclosed in FIG. 8 may be adapted for use with a number of chain saw designs as described below. In FIG. 8, like reference numerals denoting coupling structure similar to that shown in FIG. 7 are used, but with a prime designation.

The annular coupling 70' includes an upper portion 72' and a lower portion 74' separated by an integral rib or flange 76'. The upper portion is profiled or ribbed at 78' to form a groove 79' for the same purpose as groove 79 in the FIG. 7 embodiment.

The lower end of the coupling 70' is provided with a hard rubber (or like material) insert 88 which may be molded in place or otherwise adhesively secured within the lower portion 74' of the coupling. To reinforce this area of the coupling, annular ribs 90 may be formed in the coupling, extending about the lower periphery thereof.

As best seen in FIG. 9, the adapter 88 is provided with an outlet aperture 92 for directing air from the filter assembly to the inlet of a carburetor. At the same time, the adapter is also provided with mounting apertures 94 for receiving mounting hardware, such as screws (not shown) by which the coupling may be secured to the associated carburetor.

By providing the adaptor 88 with outlet and mounting apertures of appropriate shape, size and location, it will be appreciated that the coupling 70' may be adapted for use with a number of different engine/carburetor designs. For example, one example of a carburetor manifold is shown at 96 in FIG. 8 attached to the coupling 70'. It will be understood, of course, that manifold 96 would normally be secured to the carburetor of an engine by suitable means associated with a mounting flange 97 surrounding a manifold outlet aperture 99. The manifold 96 is provided with an inlet and mounting apertures which correspond to those formed in the adaptor 88. In addition, a reinforcing washer or bushing 98 is provided on the air filter side of the adaptor 88 so that the adaptor 88 is, in effect, clamped between the washer 98 and corresponding inlet surface of the manifold 96.

It will be noted that the center line 100 of the coupling 70' is offset with respect to the center line 102 of the outlet aperture. This eccentric arrangement serves to offset the coupler 70' as well as the entire filter housing assembly from the engine to further facilitate access and removal of the upper component 12 of the housing assembly, and to provide additional space for the introduction of air through the apertures 20 formed in the lower housing component 10.

It will be understood that other coupler configurations may be provided, simply by matching the configuration of adaptor 88 to the specific configuration of the carburetor inlet of various chain saw or other power tool engine designs.

The above described couplings provide versatility in that they serve to adapt the filter housing for virtually universal application to the majority of chain saw engine designs. In addition, the inherent flexibility of the couplings eliminates the conventional rigid connection between air filter elements and engine carburetors. In this manner, damage to the filter, filter housing and/or carburetor upon impact is prevented or minimized.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A housing assembly for an air cleaner element mountable on an internal combustion engine of a chain saw, said element having upper and lower surfaces and at least one peripheral side surface, the housing assembly comprising:
   (a) a lower base component comprising a peripheral flange portion for supporting the air cleaner element, and a centrally located hub portion defined by an upstanding peripheral wall which extends upwardly a distance greater than one-half the height of the filter element, said flange portion extending radially outwardly from a lowermost end of the hub portion; said flange portion including at least one aperture for introducing air into the assembly, and said hub portion having an outlet at an upper end of said upstanding peripheral wall;
   (b) an upper component adapted for mating engagement with said lower component, and comprising a cover for surrounding and enclosing at least the upper and peripheral side surface of the air cleaner element; the upper component further including means enabling releasable attachment of the upper component to the lower component; and
   (c) a coupling for flexibly connecting the housing to the engine.

2. A housing assembly as defined in claim 1 wherein a plurality of apertures are located about the periphery of said flange portion.

3. A housing assembly as defined in claim 2 wherein said apertures are located radially outwardly of said supporting surface means.

4. A housing assembly as defined in claim 1 wherein said upper component includes an upper substantially horizontal wall and a peripheral, depending skirt portion depending from the substantially horizontal wall, said depending skirt provided at its lowermost end with a horizontal shoulder for engagement with the peripheral flange portion of the lower base component.

5. A housing assembly as defined in claim 4 wherein fastener means extend between the substantially upstanding hub portion of the lower base component and the upper substantially horizontal wall of the upper component.

6. A housing assembly as defined in claim 4 wherein the upper substantially horizontal wall of the upper component is adapted to engage the upper surface of the air cleaner element to thereby constrain air introduced through said apertures to flow through the air cleaner element and said outlet means.

7. A housing assembly as defined in claim 1 wherein said lower base component and said upper component are substantially round, and are adapted to enclose a substantially cylindrical, hollow air cleaner element.

8. A housing assembly as defined in claim 1 wherein said upper and lower components are constructed of transparent plastic material.

9. An air cleaner assembly for an internal combustion engine comprising:
   (a) a substantially annular air cleaner element including filter media sandwiched between upper and lower ring members; and
   (b) a filter housing enclosing said air cleaner element, said housing including means for uniformly introducing air adjacent a lower end of the air cleaner element, and for discharging air into said engine at a location closer to the upper ring member of the air cleaner element than the lower ring member of the air cleaner element, and means for flexibly coupling said housing assembly to said engine.

10. An air cleaner assembly as defined in claim 9 wherein said housing includes upper and lower components and means for releasably securing said components together.

11. An air cleaner assembly as defined in claim 10 wherein said means for introducing air uniformly into said filter element comprises a plurality of apertures arranged below and about said filter element.

12. An air cleaner assembly as defined in claim 10 wherein said lower component includes outlet means for receiving said flexible coupling means.

13. An air cleaner assembly as defined in claim 9 wherein said coupling means includes carburetor adapter means for facilitating attachment of said air cleaner assembly to said engine.

14. An air cleaner assembly as defined in claim 13 wherein said said carburetor adapter means includes mans for mounting said coupling means eccentrically with respect to an inlet provided in an associated carburetor manifold.

15. An air cleaner assembly as defined in claim 9 wherein said housing is constructed of transparent plastic material.

16. A chain saw powered by an internal combustion engine having a carburetor, and including an air cleaner assembly mounted on the carburetor, said air cleaner assembly comprising an air filter element and a housing enclosing said filter element; said housing including an air inlet and an air outlet, said outlet raised substantially relative to said inlet; and a flexible, tubular coupling for non-rigid attachment of the housing to the chain saw.

17. A chain saw as defined in claim 16 wherein said an inlet means includes a plurality of apertures formed in said housing and surrounding said filter element.

18. A chain saw as defined in claim 17 wherein said housing includes upper and lower components and means for releasably securing said components together.

* * * * *